Sept. 2, 1952 L. H. PONNEQUIN 2,609,243
HUB STRUCTURE
Filed Jan. 2, 1948 2 SHEETS—SHEET 1
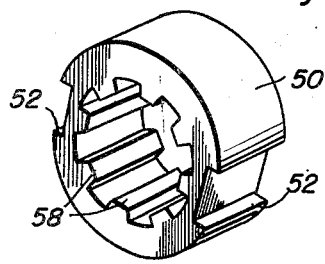
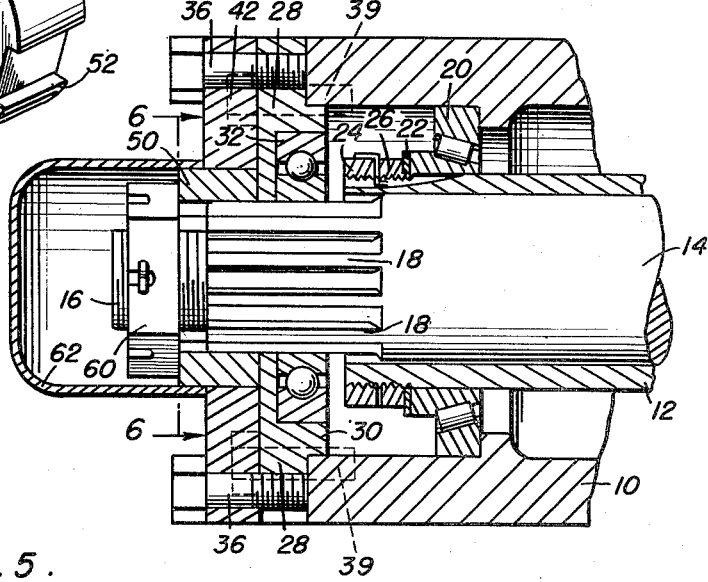
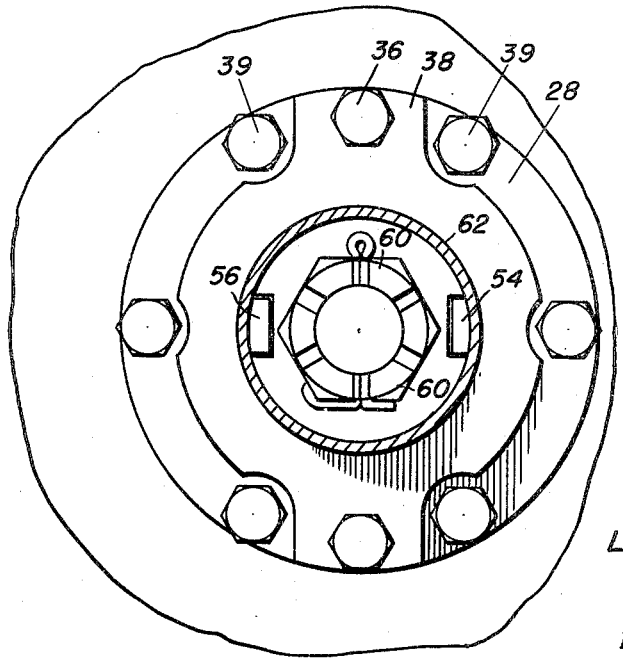
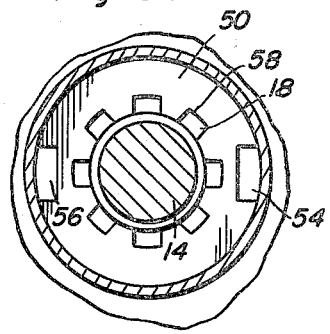
Louie H. Ponnequin
INVENTOR.

Sept. 2, 1952      L. H. PONNEQUIN      2,609,243
HUB STRUCTURE

Filed Jan. 2, 1948      2 SHEETS—SHEET 2

Louie H. Ponnequin
INVENTOR.

BY Clarence A. O'Brien
and Harvey B. Jackson
Attorneys

Patented Sept. 2, 1952

2,609,243

UNITED STATES PATENT OFFICE 2,609,243

HUB STRUCTURE

Louie H. Ponnequin, Honolulu, Territory of Hawaii

Application January 2, 1948, Serial No. 9

4 Claims. (Cl. 301—1)

This invention appertains to novel and useful improvements in attachments for vehicles.

An object of this invention is to transpose a freely rotating wheel of a vehicle to a driver wheel.

Another object of this invention is to easily convert the driving front wheel of a four wheel drive vehicle to a freely rotating wheel.

Another object of this invention is to interpose a sleeve between the splined portion of a shaft and a plate and connect the sleeve drivingly to the said plate and the said shaft or axle.

Another purpose of this invention is to arrange the said sleeve so that it may be conveniently attached and detached whereby the torque of the axle may be easily utilized or spent in harmless free rotation.

Another object of this invention is to provide an improved, inexpensive and convenient means for carrying out the above mentioned functions.

A further object of this invention is to readily convert the driving wheels of a four wheel drive vehicle which are positioned at the forward end thereof, to freely rotating wheels under certain conditions of operation of the vehicle, particularly on flat, hard surfaced roads.

Ancillary objects and features of novelty will become apparent to those skilled in the art, in following the description of the preferred form of the invention, illustrated in the accompanying drawings, wherein:

Figure 1 is a sectional view of a front wheel assembly of a vehicle of the four wheel drive type, showing the invention adapted for use therewith;

Figure 5 is an end view of the invention illustrated in Figure 1, portions being broken away in section to illustrate details of construction;

Figure 6 is a sectional view taken substantially on the line 6—6 of Figure 1 and in the direction of the arrows;

Figure 7 is a perspective view of a sleeve forming a portion of the invention;

Figure 2:
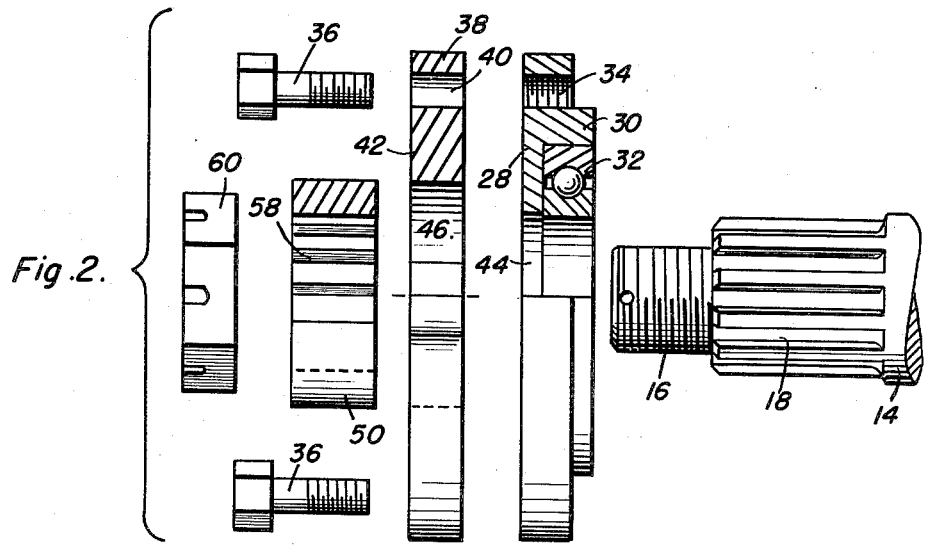
Figure 2 is an exploded elevational view of the components of the invention, portions being shown in section to illustrate details of construction.

This invention has been developed to provide a device for easily converting the front or rear wheels of a vehicle from driving wheels to freely rotating wheels. As is well-known, it is undesirable to utilize a four wheel drive on hard surfaced roads for any travel involving more than but a few miles. Excessive wear of tires and excessive drag results thereby rendering operation of the vehicle uneconomical.

It is therefore one of the prime purposes of the invention to easily convert the wheels of a vehicle from driving wheels to freely rotating elements. At present, there is a large supply of four wheel drive vehicles available and under normal operating conditions, it is desired that these four wheel drive vehicles be converted to conventional two wheel drive devices. A simple manipulation and attachment of the present device illustrated in the accompanying drawings performs this function.

There are many variations which may be resorted to in operation of the present invention and particularly for the attachment thereof. Referring to Figure 1, the conventional apparatus utilized in association with the wheel drive portion of vehicles is clearly evident. The wheel hub 10 is provided with the usual axle housing 12 therein and an axle 14 rotatably positioned within the said housing 12. The terminal portion of the axle 14 is threaded as at 16 and is provided with a plurality of splines 18 thereadjacent.

Conventional thrust bearings 20 are supplied on the said sleeve 12 and of course, the usual packing elements 22 with conventional locking nuts 24 and 26 respectively are used in association with the assembly.

Referring now to Figure 2, it will be noted that a first place 28 is supplied with a shoulder 30 extending therearound and into engagement with the bore of the wheel hub. Seated in the shoulder is a conventional anti-friction bearing 32, which bearing is adapted to seat on the splined portion of the shaft 14. This plate 28, together with the bearing 32, provides a stable and sturdy supporting structure between the axle and the wheel hub. A plurality of threaded apertures 34 are supplied in the first plate 28 for the purpose of receiving conventional bolts 36 therein.

The bolts 36 also extend through flanges 38 having suitable apertures 40 formed therein. The flanges 38 are a portion of a second plate 42 which is juxtaposed relative to the first plate 28 as is seen in Figure 1. The plate 28 is secured to the wheel hub 10 by means of bolts 39 as shown in Fig. 5, such bolts extending through openings 41 in the plate 28 and into the conventional threaded holes in the end of the hub 10.

The said shoulder 30 is seated within the hub 10 forming an efficacious seal and seating arrangement. Further, both of the plates 28 and 42 have central apertures 44 and 46 respectively formed therein, for the purpose of accommodating the terminal portion of the axle 14.

Means for transposing the wheel attached to the said hub assembly, from a freely rotating to a driving connection or vice versa is provided. The preferable means is in the form of a sleeve 50 having slots 52 extending axially thereof. The slots cooperate with lugs 54 and 56 respectively which are formed integral with the second plate 42 and extend within the aperture 46. In operation, the sleeve 50 is simply slipped within the aperture 46, the lugs 54 and 56 respectively registering with the slots 52. Thus, it is seen that a driving connection is supplied between the sleeve 50 and the second plate 42.

Also, the sleeve 50 is formed with a plurality of splines 58 therein, which splines cooperate with the said splines 18 of the axle 14. Through this medium, the sleeve 50 is held immovable relative to rotative motion between the sleeve 50 and the terminal portion of the axle 14.

A conventional castle nut 60 may be secured on the threaded portion 16 of the axle 14 thereby completing the assembly and a cap 62 may be positioned around the collar or sleeve 50 to retain any grease drippings and otherwise serve a function conventional in such caps.

In operation, utilizing the sleeve 50, the first plate 28 may be operatively connected with the splined portion 18 of the axle and retained in position. Then, if it is desired to utilize the device with the absence of a driving connection at this particular wheel, the smooth sleeve or collar 64 may be substituted for the sleeve 50. This of course, permits the wheel to be freely rotated relative to the shaft or axle 14. Then, the castle nut 60 may be fixed to the threaded portion of the axle 14 for maintaining the assembly in position.

When it is desired to supply a driving connection between the axle 14 and an associated wheel, the collar 64 may be removed and the sleeve or collar 50 substituted therefor. By this construction, a driving connection is produced.

Figure 3:
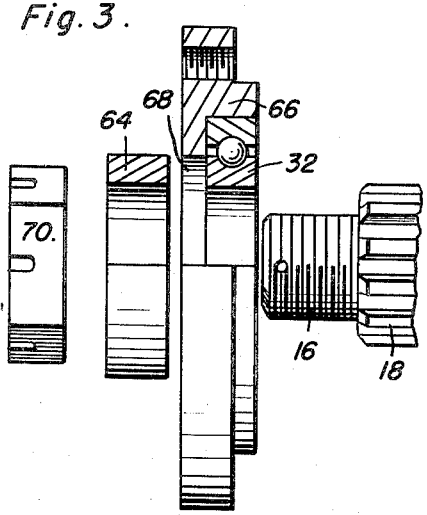
Figure 3 is an exploded elevational view of selected portions of the invention, with certain parts thereof shown in section to illustrate details of construction.
Figure 4:
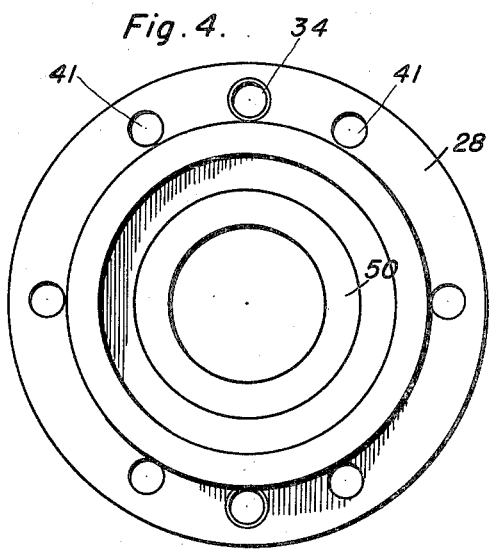
Figure 4 is an end view of one of the plates and a collar forming a portion of the invention.
Figure 8:
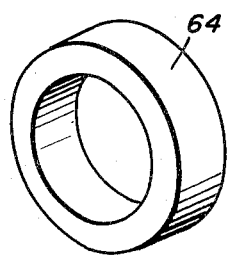
Figure 8 is a perspective view of a collar which may be used in lieu of the sleeve for certain conditions of operation.

Reference is made primarily to Figure 3 wherein a slightly modified form of the invention is disclosed. This form of the invention is utilized in connection with certain makes and types of vehicles wherein it is desired simply to convert from a driving wheel to a freely rotating wheel.

A first plate 66 is supplied about the splined portion of the axle 14 and spaced therefrom through the medium of a conventional ball bearing race 32. The collar 64 may be then supplied in the aperture or recess 68 and backed by means of the castle nut 70. Obviously, the drive is then converted to a freely rotating apparatus.

While there has been described and illustrated but preferred forms of the invention it is apparent that variations may be made without departing from the spirit thereof.

Having described the invention what is claimed as new is:

1. In a vehicle including a splined axle, means transposing a freely rotating wheel on said axle to a driving wheel comprising a first plate secured within the hub and supporting the axle, said first plate having the splined portion of said axle extending therethrough, a second plate positioned around the splined portion of the axle, means for fastening said plates together, a collar interposed between the said second plate and the axle, means for drivingly connecting said axle and said collar, and means for drivingly connecting said collar and said second plate.

2. The combination of claim 1 wherein said means for connecting the collar and second plate includes lugs attached to the second plate, and slots in said collar engaging said lugs.

3. The combination of claim 2 wherein said collar and axle connecting means includes splines formed in the bore of said collar and connected with the splines of the axle.

4. The combination of claim 1 wherein said collar is replaceable by a substitute collar freely rotatable with respect to said axle and second plate.

LOUIE H. PONNEQUIN.

REFERENCES CITED

The following references are of record in the file of this patent:

UNITED STATES PATENTS

| Number | Name | Date |
|---|---|---|
| 1,171,244 | Pugh | Feb. 8, 1916 |
| 1,179,949 | Mellin | Apr. 18, 1916 |
| 1,451,267 | Masury | Apr. 10, 1923 |
| 1,482,838 | Casale | Feb. 5, 1924 |
| 2,052,524 | Baker | Aug. 25, 1936 |
| 2,145,089 | Kysor | Jan. 24, 1939 |